(12) United States Patent
Choi et al.

(10) Patent No.: US 8,349,774 B2
(45) Date of Patent: Jan. 8, 2013

(54) PREPARATION METHOD OF LUBRICATING OIL AND LUBRICATING OIL PRODUCED THEREBY

(75) Inventors: Cheol Choi, Daejeon (KR); Je Myung Oh, Daejeon (KR); Mi Hee Jung, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 302 days.

(21) Appl. No.: 12/765,321

(22) Filed: Apr. 22, 2010

(65) Prior Publication Data
US 2011/0046028 A1   Feb. 24, 2011

(30) Foreign Application Priority Data
Aug. 18, 2009   (KR) .................. 10 2009 0075989

(51) Int. Cl.
*C10M 169/04* (2006.01)
*C10M 125/04* (2006.01)
*C10M 125/06* (2006.01)

(52) U.S. Cl. .................. 508/150; 508/113; 508/152
(58) Field of Classification Search .................. 508/113, 508/150, 152
See application file for complete search history.

(56) References Cited

U.S. PATENT DOCUMENTS
2005/0271566 A1* 12/2005 Yadav .................. 423/1
2007/0293405 A1* 12/2007 Zhang et al. .................. 508/113
2008/0312111 A1* 12/2008 Malshe et al. .................. 508/155

FOREIGN PATENT DOCUMENTS
KR   10-0614888 B    8/2006
KR   10-2009-0033301 A   4/2009

OTHER PUBLICATIONS
Korean Office Action, issued in Korean Patent Application No. 10-2009-0075989, dated Apr. 27, 2011.

* cited by examiner

Primary Examiner — Walter D Griffin
Assistant Examiner — Francis C Campanell
(74) Attorney, Agent, or Firm — McDermott Will & Emery LLP (57) ABSTRACT

Provided are a mixed nano-lubricating oil and a method for preparing the same. The method for preparing a mixed nano-lubricating oil includes the steps of: (a) preparing a mixed solution by adding and mixing a nanopowder and a dispersant to a solvent and pulverizing the nanopowder to a primary particle level; (b) modifying the surface of the nanopowder; (c) substituting the solvent of the mixed solution to a lubricating oil; and (d) mixing at least two nano-lubricating oils prepared using physically and chemically different nanopowders. According to the present invention, it is possible to improve the wear resistance and the load resistance at the same time by mixing at least two kinds of lubricating oils having excellent wear resistance or load resistance.

4 Claims, 6 Drawing Sheets

PREPARATION METHOD OF LUBRICATING OIL AND LUBRICATING OIL PRODUCED THEREBY

CROSS-REFERENCE TO RELATED APPLICATION

This application claims priority to and the benefit of Korean Patent Application No. 10-2009-0075989, filed on Aug. 18, 2009, the disclosure of which is incorporated herein by reference in its entirety.

BACKGROUND

1. Field of the Invention

The present invention relates to preparation method of lubricating oil and lubricating oil produced thereby. More particularly, the present invention relates to preparation method of lubricating oil and lubricating oil produced thereby, which has excellent extreme pressure load resistance and wear resistance properties.

2. Discussion of Related Art

Typically, lubricating oil should have an appropriate viscosity at its operating temperature, have a small change in the viscosity in response to a change in the operating temperature, form a stable oil film even in the boundary lubrication, and have a high stability to heat and oxidation.

However, recently, due to high performance, high power, and large scale of various lubrication and lubrication devices, the operating load and temperature are increased, and thus the durability of the device and lubricating oil is reduced and the frequency of failures increases.

A nano-lubricating oil provided by the present invention is prepared by mixing an existing oil with a metal alloy oxide or non-metal nanoparticles and an extremely small amount of dispersant, which allows the metal alloy oxide or non-metal nanoparticles to be well dispersed in a colloid state, and it was confirmed that the nano-lubricating oil has a significant effect on the reduction in the coefficient of friction and the oil temperature.

This has been actually applied to vehicle engine oils and, recently, extensive research aimed at applying such lubricating oils to gear oil, cutting oil, and the like has continued to progress.

For example, in the case of the gear oil, in order to improve the extreme pressure properties, an attempt to improve the friction, wear, and lubricating properties by pulverizing tungsten disulfide ($WS_2$) or molybdenum disulfide ($MoS_2$), which is conventionally used as a solid lubricant, to nanoparticles as it is and dispersing the nanoparticles into the lubricating oil have been extensively made in the related industry. However, the specific gravity of the material is too high to improve the dispersibility, and an increase in the cost limits the commercialization. Recently, an attempt to reduce the specific gravity of the material by the formation of fullerene-like structure is made; however, satisfactory results are not obtained in terms of the size of the synthesized powder and the dispersibility. The reason is that when the nanopowder added to the lubricating oil is precipitated, the nanopowder does not act as an additive any longer, but acts as an impurity, thereby accelerating the deterioration of the material and its physical properties.

Moreover, a sufficient effect can be obtained even when an extremely small amount of nanopowder in a single composition is added for the purpose of reducing the coefficient of friction such as an engine oil additive. However, there are many difficulties in significantly improving both the load resistance and wear resistance properties of the lubricating oil under high load conditions. That is, the conditions for improving the load resistance properties of the lubricating oil and the conditions for improving the wear resistance properties of the powder do not coincide with each other, and thus there are many materials which maximize one of the properties. However, it is difficult to find a material which can maximize more than two properties at the same time.

SUMMARY OF THE INVENTION

The present invention has been made in an effort to solve the above-described problems associated with prior art, and an object of the present invention is to provide a mixed nano-lubricating oil and a method for preparing the same, which can satisfy both the load resistance and wear resistance properties and is economical and has excellent dispersibility.

According to an aspect of the present invention, there is provided a method for preparing a mixed nano-lubricating oil, the method including: (a) preparing a mixed solution by adding and mixing a nanopowder and a dispersant to a solvent and pulverizing the nanopowder to a primary particle level; (b) modifying the surface of the nanopowder; (c) substituting the solvent of the mixed solution to a lubricating oil; and (d) mixing at least two nano-lubricating oils prepared using physically and chemically different nanopowders.

Step (d) may include uniformly redispersing the nanopowder using a high-energy disperser including a bead mill, an ultrasonic pulverizer or a high-pressure homogenizer after the mixing step.

The method for preparing a mixed nano-lubricating oil may further include the step of (e) mixing a pure lubricating oil with the mixed nano-lubricating oil.

The nanopowder may have a diameter of 0.1 to 100 nm.

The nanopowder may have a concentration of 0.1 to 10 vol %.

The nanopowder may include a metal, an alloy, an oxide, or a non-metal.

According to another aspect of the present invention, there is provided a mixed nano-lubricating oil prepared by the method of the present invention.

The mixed nano-lubricating oil and the method for preparing the same of the present invention have the following effects.

Firstly, according to the method for preparing a mixed nano-lubricating oil of the present invention, it is possible to prepare a mixed nano-lubricating oil having excellent extreme pressure load resistance and wear resistance by performing the wet pulverization and the surface modification at the same time and mixing at least two nano-lubricating oils prepared using physically and chemically different nanopowders prepared by substituting a solvent to oil by vacuum concentration.

Secondly, since the method for preparing a mixed nano-lubricating oil of the present invention dilutes each nano-lubricating oil with a pure oil, it is possible to freely determine the mixing ratio and select the composition according to the application.

Thirdly, the method for preparing a mixed nano-lubricating oil of the present invention can be used in the preparation of a high efficiency cooling nanofluid using a metal, an alloy, an oxide, or a non-metal nanopowder.

Fourthly, according to the method for preparing a mixed nano-lubricating oil of the present invention, it is possible to obtain the lubricating properties of an equivalent level even the use of a lubricating oil having a viscosity lower than that of the lubricating oil used at preset. Moreover, since the mixed nano-lubricating oil according to the present invention has low viscosity, it has relatively high cooling properties, and thus it is possible to reduce the operating rate or the volume of a circulation pump and a cooling fan, thus reducing the amount of energy consumed.

Fifthly, according to the method for preparing a mixed nano-lubricating oil of the present invention, it is possible to effectively reduce the friction heat, and thus it is possible to extend the durability of the lubricating oil by preventing the temperature of the lubricating oil from rising. Moreover, it is possible to extend the durability of an expensive large gear and prevent a failure by effectively prevent the wear of the parts such as the gear during operation under heavy load.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail below with reference to the accompanying drawings such that those skilled in the art to which the present invention pertains can easily practice the present invention.

A mixed nano-lubricating oil in accordance with the present invention is prepared in such a manner that a nanopowder having a diameter less than an average diameter is pulverized to the primary particle level (less than 100 nm) using a high-energy wet disperser, the surface of the nanoparticles is subjected to lipophilic modification using a dispersant, and then the solvent used is substituted by vacuum concentration.

The nanopowder used to prepare the nano-lubricating oil is a pure metal and carbon-based material having excellent heat transfer and dispersibility. Moreover, the average particle size of the powder is less than 100 nm so as to prevent the precipitation and improve the heat transfer properties, and the concentration of the nanopowder is in a range of 0.01 to 1.0 vol % so as to prevent an increase in the viscosity of the lubricating oil and ensure the fluidity.

Figure 1:
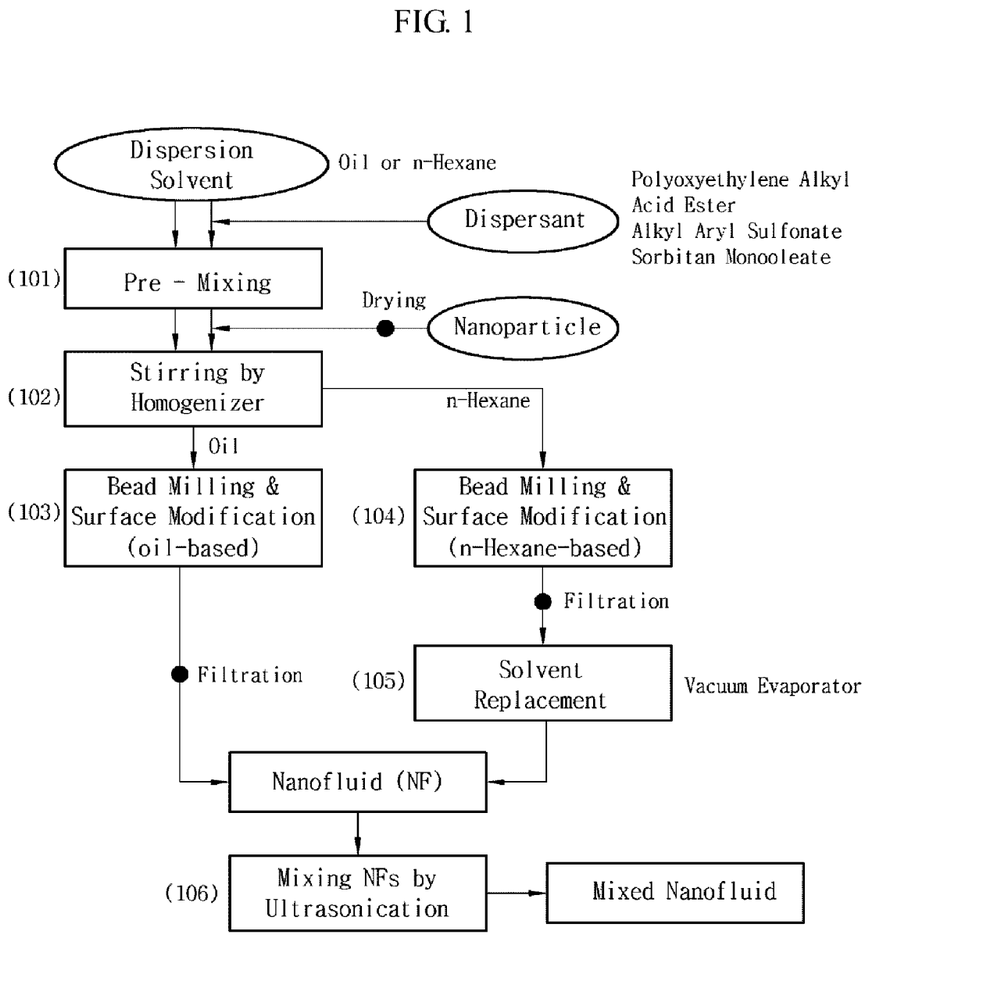
FIG. 1 is a block diagram showing a method for preparing a mixed nano-lubricating oil in accordance with an exemplary embodiment of the present invention.

FIG. 1 shows an overall process for preparing a mixed nano-lubricating oil in accordance with an exemplary embodiment of the present invention, which will be schematically described below.

The nanopowder is very fine and thus is oxidized or agglomerated into large lumps when it is exposed to the air even for a short time. Thus, the nanopowder is handled in a glove box under a gas atmosphere. The nanopowder and a dispersant are mixed with a predetermined amount of n-hexane in a fixed ratio, and the resulting mixture is mixed using a homogenizer for about 30 minutes and then placed in a bead mill containing beads to be subjected to bead-milling (S100) for more than two hours.

The dispersant added in the mixture acts on the surface of the nanopowder, which is newly exposed when the agglomerated nanopowders are separated, thus forming a surface modifying layer on the surface of the powder (S200 & S210). That is, the wet dispersion and the surface modification are simultaneously performed. The dispersant may vary according to the nanopowder and dispersion medium so as to provide optimum properties.

The solution prepared by the above-described process is mixed with a lubricating oil in a ratio of 1:1 and vacuum-concentrated to completely remove nonvolatile n-hexane, thus preparing a lubricating oil (S300).

After preparing the nano-lubricating oils made of different components to have different properties, the nano-lubricating oils are mixed with each other to prepare a mixed nano-lubricating oil (S400). In detail, after mixing the respective nano-lubricating oils, the resulting mixture is dispersed using a strong ultrasonic disperser for about 30 minutes to complete the mixed nano-lubricating oil (S500).

The above-described process will be described in detail below step by step.

Selection of Powder

The nano-lubricating oil may be made of nanopowder prepared by either a dry or wet process. Especially, in the case of the oxide and metal powder, the wet process is typically used in which a solution containing metal ions is mixed with a solution containing a reducing agent or a surfactant serving as a reducing agent to produce fine metal powder.

To obtain the fine metal powder and improve the dispersibility, the surfactant coating layer formed on the surface of the powder in the powder synthesis process should have lipophilic properties to facilitate the dispersion of lubricating oil.

A powder having a smaller or larger particle size should not be used to improve the extreme pressure load resistance properties of the lubricating oil. On the contrary, it is recommended to use a powder having a smaller particle size to improve the wear resistance properties.

However, in all cases, the optimum particle size of the powder has a close correlation with the hardness of the powder and, typically, the higher the hardness of the powder, the more the optimum particle size of the powder is reduced. Moreover, when the viscosity of the lubricating oil is higher, the improvement of thermal conductivity by the addition of nanopowder is reduced. Thus, when a high viscosity lubricating oil is used as a dispersion medium, it is necessary to select the powder in consideration of the particle size, hardness, and lubricating properties of the powder, instead of the thermal conductivity of the powder.

Moreover, before the nanopowders are dispersed into the lubricating oil, it is necessary to completely remove moisture from the powder using a vacuum oven and the like to improve the dispersibility.

Meanwhile, in addition to the oxide and metal powder, an alloy or non-metal powder may be used as the nanopowder.

Wet Dispersion Process of Powder Agglomerates (S100)

When the nanopowder synthesized by chemical vapor deposition (CVD) is exposed to the air, coarse powder agglomerates having a particle size of several hundred nm to several μm are formed. Thus, when the powder agglomerates are dispersed in a liquid phase, they are readily precipitated, and the improvement of lubricating properties and heat transfer efficiency by the addition of nanopowder is not achieved.

Therefore, these coarse powder agglomerates are pulverized to the primary particle level (<Φ100 nm) using a bead mill, a high-pressure homogenizer, or an ultrasonic pulverizer having a rated power of more than 500 W. In the case of the bead mill, the dispersion effect is excellent, but it is disadvantageous in terms of maintenance management. On the contrary, the high-pressure homogenizer and the ultrasonic pulverizer are simple and easy to use and maintain. However, the dispersion effect is small and, when a tip or nozzle deteriorates, its material is exfoliated and separated to produce impurities, which are mixed with the lubricating oil.

In the case that the bead mill is used for the purpose of the pulverization and dispersion, it is recommended to use ultrafine zirconia beads having an average particle size of less than 0.1 mm and, when the beads having a larger average particle size are used, the pulverization efficiency is lowered. Moreover, since the viscosity is very high when the nanopowders are simply mixed and stirred in the dispersion medium, the mixture is pre-dispersed at an appropriate level using a homogenizer and the like for effective dispersion (e.g., for 30 minutes at 13,500 rpm).

When a high viscosity material is used as a dispersion medium in the bead mill, it is difficult to separate ultrafine beads from the nanopowder. Thus, when the solvent used to prepare a nanofluid is a high viscosity material, a low viscosity solvent such as n-hexane is used as a dispersion medium and the solvent is substituted by vacuum concentration.

The amount of powder fed into the bead mill significantly depends on the size of reaction chamber and the viscosity of the dispersion medium and the shape of the powder (e.g., spherical, acicular, or tubular shape). In the case of the typical spherical shape, when the volume of the reaction chamber is 150 ml and an n-hexane having a viscosity of 0.32 cP at 25 C.° is used as the dispersion medium, it is preferable that about 20 g of the powder is fed into the bead mill.

As such, after the n-hexane as the dispersion medium, the nanopowder, and the zirconia beads are mixed in a certain ratio (e.g., 1,000 ml, 20 g, and 400 g based on the 150 ml reaction chamber) and placed in the bead mill to be milled above 3,000 rpm for 1 to 4 hours. The milling time is suitably adjusted according to the amount of nanopowder and, when the amount of nanopowder is increased, the milling time is extended. However, when an excessive amount of nanopowder is fed, the dispersion effect is reduced regardless of the milling time, and thus it is necessary to pay attention to the determination of the amount of nanopowder fed into the bead mill.

Moreover, the excessive pulverization and dispersion process for more than a predetermined period of time causes an over-dispersion of the mixed fluid, which increases the particle size of the powder. Thus, it is necessary to determine optimum operation conditions.

Surface Modification Process (S200, S210)

Although the nanopowder agglomerates having a size of several hundred nm to several tens of μm are pulverized to the primary particle level (<Φ100 nm) during the wet pulverization and dispersion process, the particles are agglomerated again with the passage of time, which results from the van der Waals force which acts between the nanoparticles to reduce the surface energy of the nanopowder increased in the pulverization and dispersion process.

Therefore, to prevent the agglomeration, the lipophilic surface modification is performed on the nanoparticles using a dispersant at the same time or after the wet dispersion (S200 & S210). The dispersant for the lipophilic surface modification of the metal or carbon nano-material may include polyoxyethylene alkyl acid ester, alkyl aryl sulfonate, and sorbitan monooleate, and the dispersant is added in an amount of 1 to 40 wt % with respect to the total weight of the nanopowder.

When the surface of the nanopowder has stronger hydrophilicity rather than weak lipophilicity, the lipophilic surface modification using the dispersant is easy. Thus, the surface of the carbon nano-material such as carbon nanotube is hydrophilized using a hydrochloric acid (HCl) solution, a nitric acid ($HNO_3$) solution, a sulfuric acid ($H_2SO_4$) solution, or a mixed solution thereof, and then subjected to the lipophilic surface modification, thus improving the dispersion effect. After the wet dispersion and the surface modification, foreign materials at the micrometer level and nanopowder agglomerates, which are not sufficiently pulverized, are removed using a paper filter during collection of the sample.

In the case that the n-hexane is used as the dispersant, a solvent substitution process (S300), which will be described later, is performed after the surface modification process (S200). However, in the case that the lubricating oil is used as the dispersant, the solvent substitution process is not performed after the surface modification process (S210).

Solvent Substitution Process (S300)

After mixing the n-hexane containing the wet-dispersed and surface-modified nanopowder with a pure lubricating oil in an appropriate ratio in consideration of the powder concentration of the final nano-lubricating oil to be prepared, the solvent of the mixture is substituted to the lubricating oil in n-hexane using a vacuum concentrator at a temperature of 60° C. and a vacuum of more than 20 mmHg.

A sample flask is rotated at 50 rpm or more to increase the concentration efficiency of the sample, and the degree of vacuum is reduced in units of 10 mmHg from 300 mmHg to 20 mmHg. The sample flask is held at the final vacuum degree for more than 4 hours and, when it is determined that the n-hexane is not collected, the solvent substitution is terminated.

If the n-hexane is not completely removed during the solvent substitution process, the viscosity of the lubricating oil is significantly reduced. Since the lubricating oil is a relatively high viscosity material, after the dispersion medium is substituted to the lubricating oil in n-hexane by vacuum concentration, the nanopowder may not be uniformly distributed in the lubricating oil or the nanoparticles may be slightly re-agglomerated.

Therefore, when the mixture is redispersed by an ultrasonic disperser after the solvent substitution, the average particle size of the nanopowder and the range of data variation are reduced, and thus the lubricating properties and the thermal conductivity tend to increase.

Nano-Lubricating Oil Mixing Process (S400) and Redispersion Process (S500)

When a multi-component nano-lubricating oil is prepared using at least two kinds of nanopowders, single-component nano-lubricating oils are first prepared considering the prevention of contamination of beads and the addition of dispersant, and the thus prepared single-component nano-lubricating oils are mixed in an appropriate ratio (S400).

That is, since the dispersant used for the lipophilic surface modification may vary according to the nanopowder, there may occur a case where more than two kinds of dispersants are fed simultaneously to surface-modify more than two kinds of nanopowders at a time. However, in this case, the surface modification effect may be reduced by half by the interaction between the dispersants. Moreover, in order to retain only the merits of the respective nano-lubricating oils by mixing them in an appropriate ratio, the respective nano-lubricating oils should not be simply mixed together.

For example, when the preparation of the mixed nano-lubricating oil is completed after simply mixing the respective nano-lubricating oils, only the shortcomings of the respective nano-lubricating oils are amplified, and thus it is impossible to obtain a sufficient effect of improving the properties compared to the pure lubricating oil. This is similar to the case that when the nanopowders are distributed non-uniformly in the lubricating oil, the lubricating properties are lowered.

Therefore, it is very important to perform the dispersion after mixing the respective nano-lubricating oils such that the respective nano-lubricating oils are completely mixed together using a relatively strong disperser like an ultrasonic disperser (S500).

Evaluation of Extreme Pressure Properties

Figure 2:
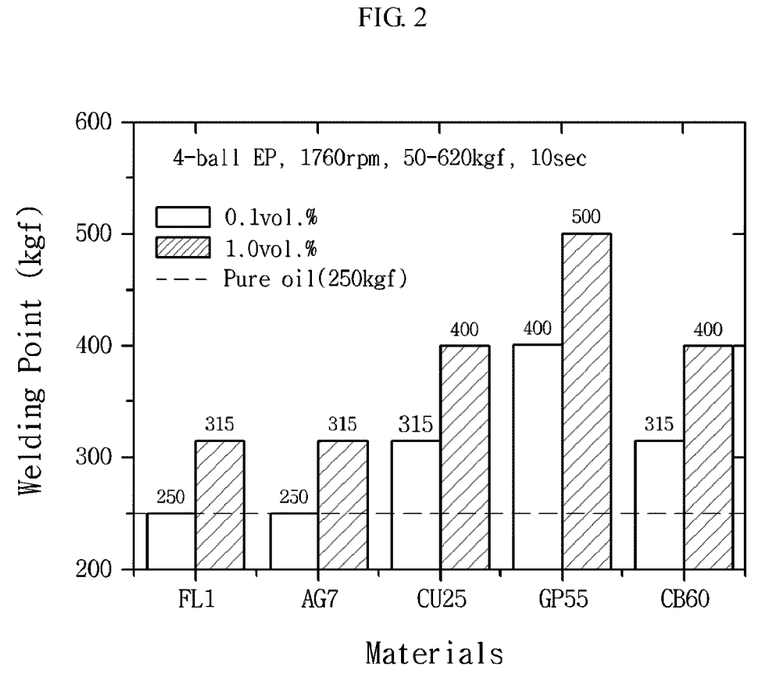
FIG. 2 is a graph showing extreme pressure load resistance properties of a nano-lubricating oil.

FIG. 2 shows the 4-ball test results in which the extreme pressure load resistance properties of the nano-lubricating oil, prepared using a plurality of carbon and metal nanomaterials, measured at concentrations of 0.1 vol % and 1.0 vol % are shown.

Here, FL1 represents the fullerene nano-lubricating oil prepared using a fullerene having an average particle size of less than 1 nm, Ag7 represents the silver (Ag) nano-lubricating oil prepared using a silver powder having an average particle size of 7 nm, Cu25 represents the copper (Cu) nano-lubricating oil prepared using a copper powder having an average particle size of 25 nm, GP55 represents the graphite nano-lubricating oil prepared using a graphite powder having an average particle size of 55 nm, and CB60 represents the carbon black nano-lubricating oil prepared using a carbon black nanopowder having an average particle size of 60 nm.

Data obtained at concentrations of 0.1 vol % and 1.0 vol % are shown in FIG. 2, in which the graphite nano-lubricating oil exhibits the highest load resistance at both concentrations and the fullerene and silver nano-lubricating oils exhibit the lowest load resistance.

Moreover, it can be seen from the graph of FIG. 2 that the load resistance increases as the concentration increases, and the load resistance generally increases as the average particle size of the powder increases, in which the nano-lubricating oils are arranged in the order of the average particle size of the powder.

Figure 3:
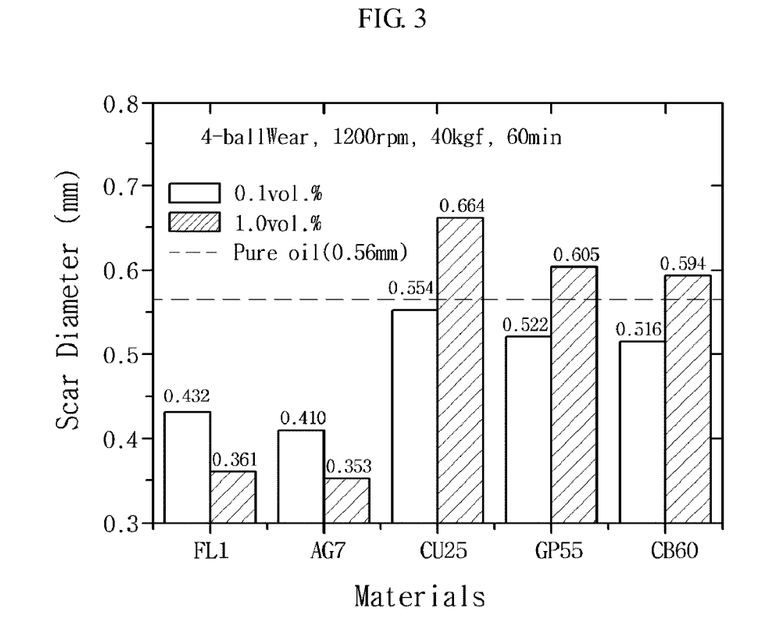
FIG. 3 is a graph showing extreme pressure wear resistance properties of a nano-lubricating oil.

Moreover, FIG. 3 shows the 4-ball test results in which the extreme pressure wear resistance properties of the nano-lubricating oil, prepared using a plurality of carbon and metal nanomaterials, measured at concentrations of 0.1 vol % and 1.0 vol % are shown.

Unlike the load resistance test data, the wear resistance is very high in the silver and fullerene nano-lubricating oils, and the copper and graphite nano-lubricating oils having the excellent load resistance exhibit the lowest wear resistance. Unlike that the load resistance increases as the concentration of the powder increases in FIG. 2, the wear resistance tends to be reduced according to the material as the concentration of the powder increases.

That is, while one material exhibits an increased wear resistance as the concentration thereof increases, another material exhibits a reduced wear resistance as the concentration thereof increases compared to the pure lubricating oil, thus accelerating the wear.

Figure 4:
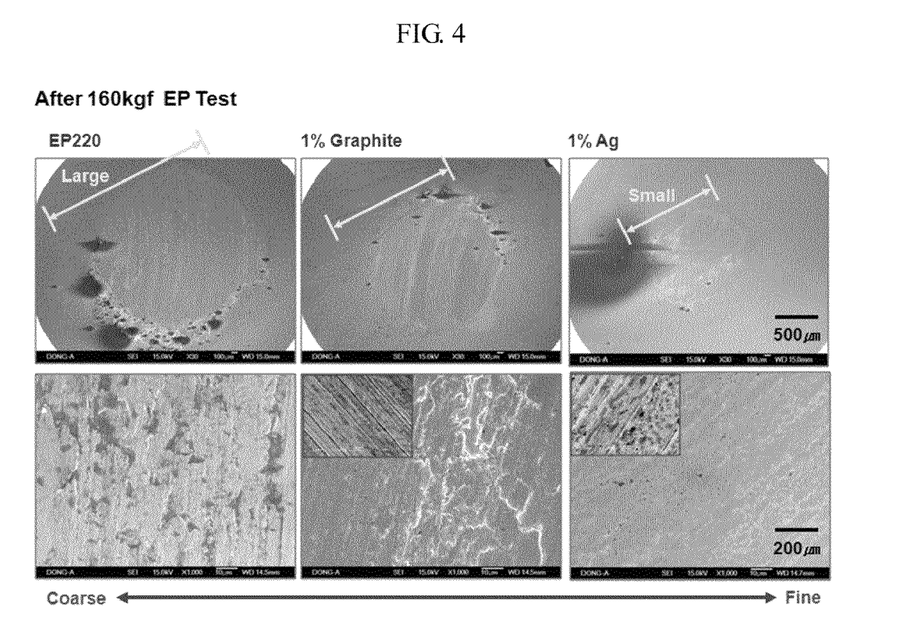
FIG. 4 shows images of sample surfaces after a load resistance test performed using a pure oil and 1 vol % graphite and silver nano-lubricant oils.

FIG. 4 shows the images of the sample surfaces after the 4-ball load resistance test is performed using the pure oil and 1 vol % graphite and silver nano-lubricant oils at a load of 160 kgf.

After the 4-ball test was performed under predetermined conditions, the diameters of wear marks on the balls were measured. The smaller the diameter, the better the load resistance, and the larger the diameter, the lower the load resistance.

The problem is that the size of the wear mark after the wear resistance test and that after the load resistance test are shown in a different way. That is, in FIG. 3, while the copper, graphite, and carbon black nano-lubricating oils exhibit lower wear resistance than that of the pure lubricating oil at a concentration of 1 vol % (in other words, exhibits larger diameters of the wear marks than that of the pure lubricating oil), they exhibits smaller diameters of the wear marks than that of the pure lubricating oil after the load resistance test.

In the load resistance test and the wear resistance test, the load and time conditions are varied in accordance with the ASTM standards. The load resistance test is to determine a load point at which four balls are welded together after the sample is rotated at 1,760 rpm and at a high load for merely 10 seconds at each step. Whereas, the wear resistance test is to measure the diameters of the wear marks remaining on the balls after the sample is rotated at 1,200 rpm and at a low load of 40 kgf for one hour. This means that when the nano-lubricating oil is used, the size of the wear mark is small and the wear surface is more gentle and level. Moreover, it can be seen from the result of the composition analysis that the graphite and silver powders are stuck on the wear surface.

Figure 5:
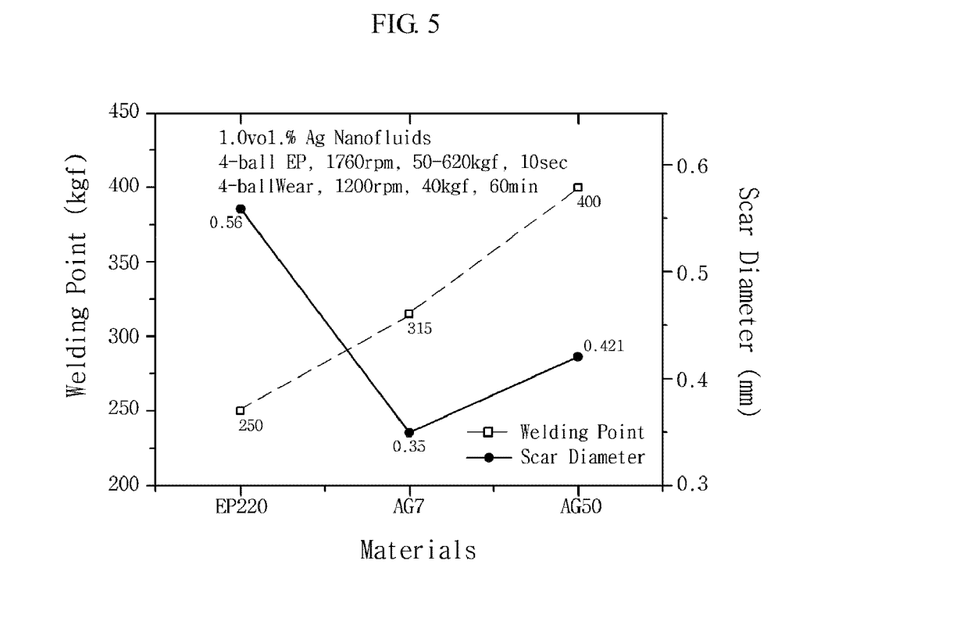
FIG. 5 is a graph showing load resistance and wear resistance properties of a silver nano-lubricating oil.

FIG. 5 shows the changes in the load resistance and wear resistance properties with respect to the size. In FIG. 5, Ag7 represents the silver (Ag) nano-lubricating oil prepared using a silver nanopowder having an average particle size of 7 nm, and Ag50 represents the silver (Ag) nano-lubricating oil prepared using a silver nanopowder having an average particle size of 50 nm.

That is, the silver nanopowders having the same composition and different sizes are used to compare the load resistance and the wear resistance, unlike those of FIGS. 2 and 3. It can be seen from the result of the test that when the size of the powder is smaller, the wear resistance increases, but the load resistance is reduced.

Figure 6:
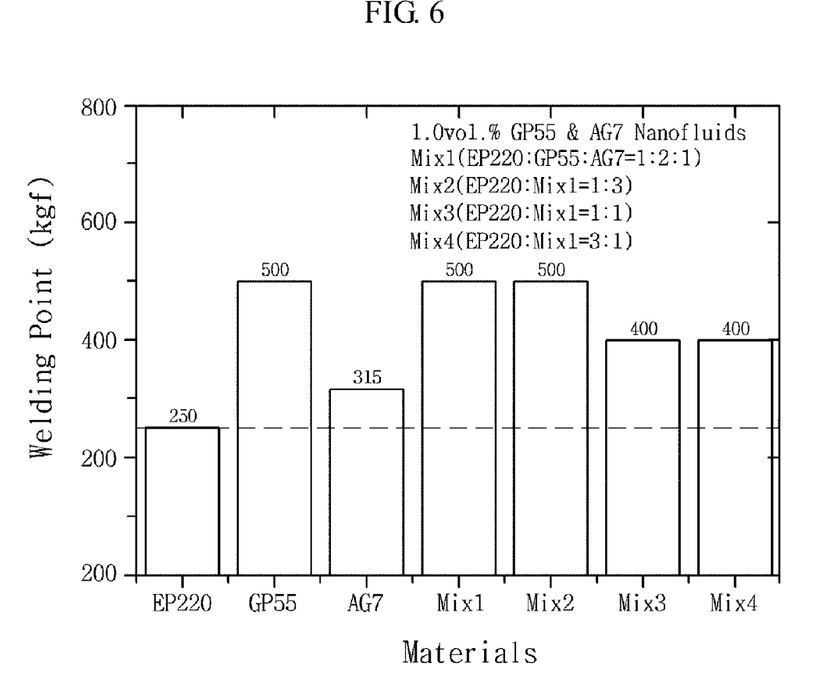
FIG. 6 is a graph showing extreme pressure load resistance properties of a mixed nano-lubricating oil and a single component nano-lubricating oil.

FIG. 6 shows the comparison results of the extreme pressure load resistance properties between the pure lubrication oil (EPP220) and the mixed nano-lubricating oils prepared by mixing 1 vol % graphite and silver powders in a predetermined ratio.

The Mix1 sample was prepared by mixing the pure lubricating oil, 1 vol % graphite nano-lubricating oil, and 1 vol % silver nano-lubricating oil in a ratio of 1:2:1, and the Mix2 to Mix4 samples were prepared by diluting the pure lubricating oil with the Mix1 sample in a ratio of 1:3, 1:1, and 3:1, respectively.

Since it is necessary to use a smaller amount of powder for the commercialization, the high-concentration samples were diluted in a predetermined ratio to examine the change in the load resistance. When comparing the dilution ratios of the samples, it can be seen that the Mix4 sample has good dispersion stability and load resistance.

Figure 7:
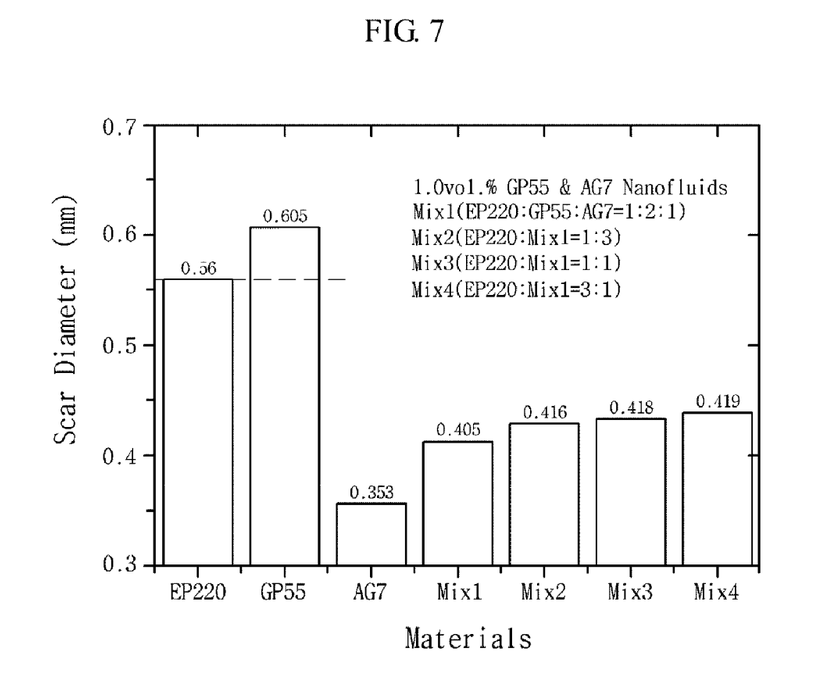
FIG. 7 is a graph showing extreme pressure wear resistance properties of a mixed nano-lubricating oil and a single component nano-lubricating oil.

FIG. 7 shows the comparison results of the extreme pressure wear resistance properties between the pure lubrication oil (EPP220) and the mixed nano-lubricating oils prepared by mixing 1 vol % graphite and silver powders in a predetermined ratio.

Figure 8:
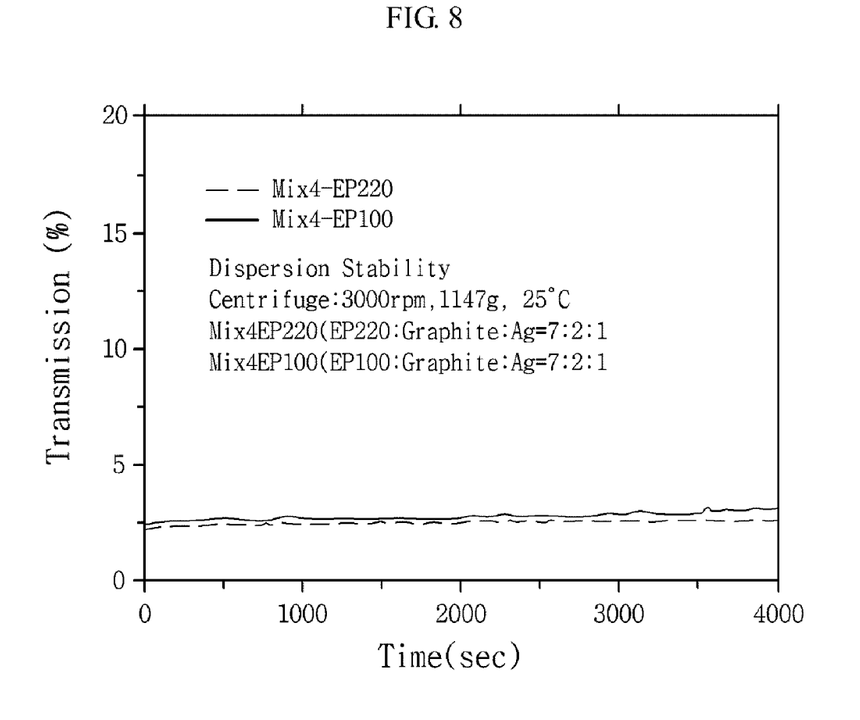
FIG. 8 is a graph showing dispersion stability of a mixed nano-lubricating oil.

FIG. 8 shows the test results of the dispersion stability of the mixed nano-lubricating oil prepared by mixing two kinds of pure lubricating oils (EP220 and EP110), 1 vol % graphite nano-lubricating oil, and 1 vol % graphite nano-lubricating oil in a weight ratio of 7:2:1, measured by applying a centrifugal force 1,147 times greater than the gravity.

The nano-lubricating oil is typically prepared by mixing the nanopowder with lubricating oil, and thus when the nanopowder is precipitated in the lubricating oil with the passage of time, the nanopowder is regarded as an impurity and is not recognized as an effective additive. Moreover, as the nanopowder is precipitated, the properties of the nano-lubricating oil disappear, and the nano-lubricating oil is changed to a material in which impurities are widely present with the original properties of the nano-lubricating oil.

To test such properties, the nanopowder was forcibly precipitated by applying a centrifugal force 1,147 times greater than the gravity using a centrifugal separator type dispersion stability tester.

The slope in the graph represents the change in the amount of near infrared rays irradiated from one side of a sample bottle and reaching a sensor located on the other side of the sample bottle. No change in the amount of near infrared rays passing through the sample bottle means that there is no change in the dispersion state of the nano-lubricating oil in the sample bottle, and thus the powder is not precipitated.

Therefore, it means that even when the nano-lubricating oil is used for a long time, there is no possibility of deterioration of properties and precipitation of powder.

Figure 9:
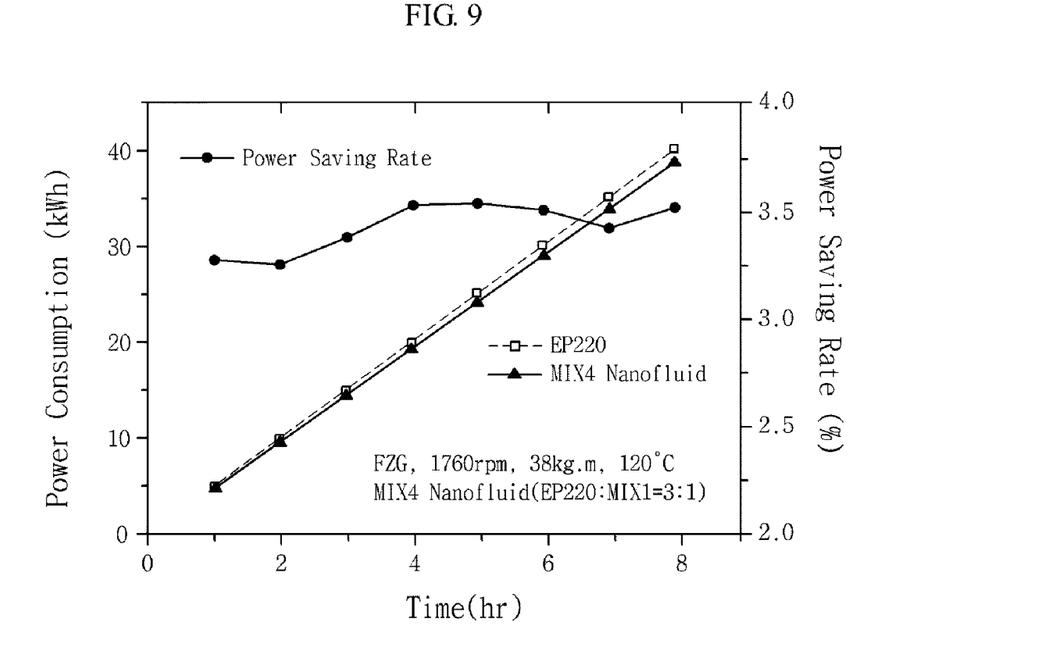
FIG. 9 is a graph showing a reduction in the amount of power consumed by a mixed nano-lubricating oil.

FIG. 9 shows the comparison results of the power saving rates between the pure lubricating oil and the mixed nano-lubricating oil prepared by mixing the pure lubricating oil (EP220), 1 vol % graphite nano-lubricating oil, and 1 vol % graphite nano-lubricating oil in a weight ratio of 7:2:1.

Since only the FZG is recognized as a gear performance tester in accordance with the international standards, the FZG was used to test to measure the amount of power consumed by the tester.

That is, it was examined how the different lubricating oils had an effect on the amount of power consumed by the FZG under the same operating conditions and, as a result, it was confirmed that the mixed nano-lubricating oil had a power saving rate of about 3.5%.

It is concluded that the above effect was obtained because the hardness and size of the added nanopowder were advantageous for the extreme pressure load resistance and wear resistance properties, rather than the reason that the powders of special compositions such as graphite and silver were added to the lubricating oil.

Therefore, it is not necessary to use to the graphite and silver powders to simultaneously maximize the load resistance and wear resistance properties. Actually, it was confirmed from FIG. 3 that even the fullerene nano-lubricating oil (FL1) having an average particle size of less than 1 nm had a wear resistance similar to the silver nano-lubricating oil. Since there is no apparent common feature between the fullerene and silver powders, it is determined that the high wear resistance properties of the nano-lubricating oil containing both fullerene and silver powders resulted from the particle size of the extremely fine powder of less than 10 nm.

Therefore, it is expected that the wear resistance of the lubricating oil can be significantly improved when an extremely small amount of nanopowder having an average particle size of 10 nm is added instead of the expensive silver or fullerene powder.

While the nanofluid is proposed to improve the heat transfer properties of the original fluid, the improvement of the heat transfer properties by the addition of the nanopowder is insignificant in high viscosity fluids such as the lubricating oil. When the viscosity of the fluid is increased, the convection transfer coefficient as well as the thermal conductivity is reduced in the state of flux.

That is, while the velocity at which the heat generated in the system is dissipated to the outside is not significantly improved even by applying the nanofluid concept, the amount of heat generated by the friction is sharply reduced, and thus the nano-lubricating oil still has a significant effect in terms of heat transfer.

However, if it is possible to reduce the viscosity of the high viscosity lubricating oil used at present to a half, it is possible to improve the heat transfer properties and, at the same time, reduce the amount of power consumed by the circulation of the lubricating oil and by the operation of a cooling fan.

Figure 10:
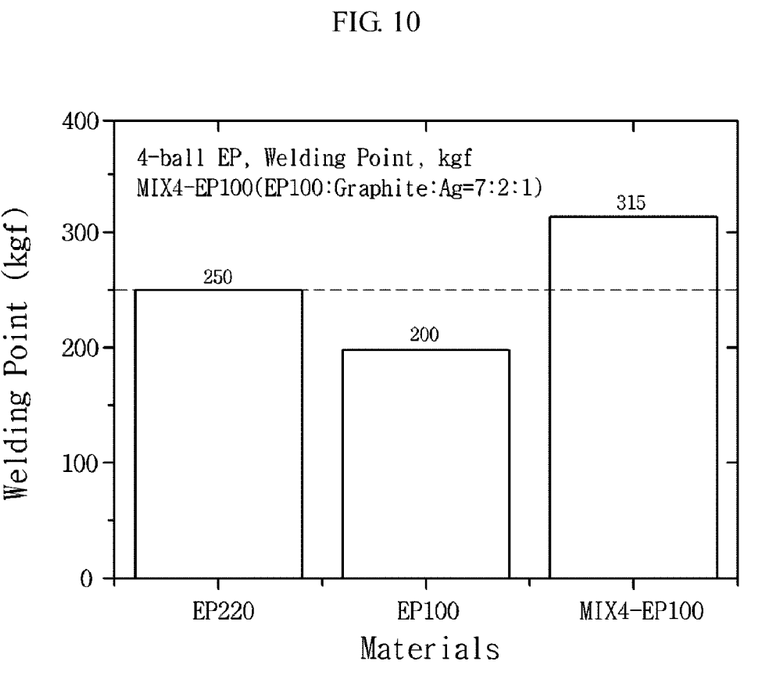
FIG. 10 is a graph showing a comparison of load resistance properties between a low-viscosity lubricating oil and a mixed nano-lubricating oil.

FIG. 10 shows the comparison results of the load resistance properties between the high viscosity lubricating oil (EP220) and the mixed nano-lubricating oil prepared by mixing the low viscosity lubricating oil (EP110), 1 vol % graphite nano-lubricating oil, and 1 vol % graphite nano-lubricating oil in a weight ratio of 7:2:1.

The nano-lubricating oil has the following two advantages. First, it improves the lubricating properties of the lubricating oil used at present to extend the durability of the gear and lubricating oil and prevent the occurrence of a failure in the rotation and lubrication device. Second, it increases the lubricating properties of the low-viscosity lubricating oil to a level of the lubricating oil used at present, and thus it can be replaced with the lubricating oil used at present.

The price of the EP100 is lower about 4 percent than that of the EP220. Therefore, it is possible to significantly reduce the addition cost required to prepare the nano-lubricating oil.

The mixed nano-lubricating oil prepared using the EP100 reduced the amount of power consumed in the FZG test about 7%, which is expected to be greater in a large scale plant.

Figure 11:
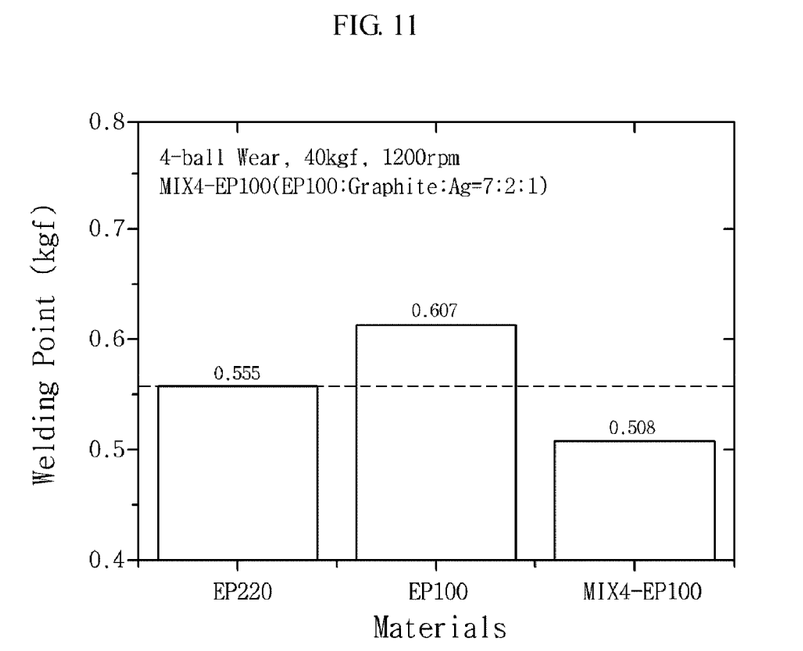
FIG. 11 is a graph showing a comparison of wear resistance properties between a low-viscosity lubricating oil and a mixed nano-lubricating oil.

FIG. 11 shows the comparison results of the wear resistance properties between the high viscosity lubricating oil (EP220) and the mixed nano-lubricating oil prepared by mixing the low viscosity lubricating oil (EP110), 1 vol % graphite nano-lubricating oil, and 1 vol % graphite nano-lubricating oil in a weight ratio of 7:2:1.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:
1. A method for preparing a mixed nano-lubricating oil, the method comprising steps of:
   (a) preparing a mixed solution by adding and mixing a nanopowder and a dispersant to a solvent, and pulveriz- ing the nanopowder to a primary particle level such that the pulverized nanopowder has a diameter of less than 100 nm;
(b) modifying the surface of the pulverized nanopowder;
(c) substituting the solvent of the mixed solution by a lubricating oil; and
(d) mixing at least two nano-lubricating oils prepared using physically and chemically different nanopowders, and uniformly redispersing nanopowders in the mixed at least two nano-lubricating oils using a high-energy disperser after the mixing.

2. The method of claim 1, further comprises the step of (e) mixing a pure lubricating oil with the mixed nano-lubricating oil.

3. A mixed nano-lubricating oil prepared by the method of claim 1.

4. The method of claim 1, wherein the nanopowder has a concentration of 0.1 to 10 vol % in the preparing step (a).

* * * * *